United States Patent
Crosby et al.

(10) Patent No.: US 10,360,089 B2
(45) Date of Patent: Jul. 23, 2019

(54) SYSTEM FOR MONITORING A PLURALITY OF DISTRIBUTED DEVICES

(71) Applicant: ARM IP Limited, Cambridge (GB)

(72) Inventors: James Crosby, Ely (GB); Marcus Chang, Cambridge (GB)

(73) Assignee: ARM IP Limited, Cambridge (GB)

( * ) Notice: Subject to any disclaimer, the term of this patent is extended or adjusted under 35 U.S.C. 154(b) by 100 days.

(21) Appl. No.: 15/259,974

(22) Filed: Sep. 8, 2016

(65) Prior Publication Data
US 2017/0075748 A1    Mar. 16, 2017

(30) Foreign Application Priority Data
Sep. 16, 2015 (GB) .................... 1516427.0

(51) Int. Cl.
*G06F 11/00* (2006.01)
*G06F 11/07* (2006.01)
*G06F 11/30* (2006.01)
*G06F 11/34* (2006.01)

(52) U.S. Cl.
CPC ...... *G06F 11/0709* (2013.01); *G06F 11/0778* (2013.01); *G06F 11/3006* (2013.01); *G06F 11/3476* (2013.01)

(58) Field of Classification Search
CPC ............. G06F 11/0709; G06F 11/0778; G06F 11/3006
See application file for complete search history.

(56) References Cited

U.S. PATENT DOCUMENTS

| | | | | |
|---|---|---|---|---|
| 5,948,112 A * | 9/1999 | Shimada | ............. | G06F 11/1407 714/16 |
| 9,910,751 B2 * | 3/2018 | McElhinney | ........... | G06F 11/26 |
| 2011/0320884 A1 * | 12/2011 | Thilagar | ............. | G06F 11/0709 714/48 |
| 2012/0144243 A1 * | 6/2012 | Carey | ................. | G06F 11/3065 714/39 |
| 2013/0290653 A1 * | 10/2013 | Hattori | .................... | G06F 12/00 711/154 |
| 2014/0325486 A1 * | 10/2014 | Zhang | ................. | G06F 11/3692 717/125 |
| 2016/0092295 A1 * | 3/2016 | Rajkovic | ............. | G06F 11/0781 714/49 |

OTHER PUBLICATIONS

Search Report dated Feb. 8, 2016 for GB Application No. 1516427.0, 6 pages.
Examination Report dated Jan. 25, 2019 for GB Application No. 1516427.0, 5 pages.

* cited by examiner

*Primary Examiner* — Philip Guyton
(74) *Attorney, Agent, or Firm* — Patterson Thuente Pedersen, P.A.

(57) ABSTRACT

Apparatus and methods for remotely monitoring a plurality of distributed devices is provided. The apparatus and methods determine logging conditions which define a state of a device at which recording of the state of the device should begin prior to an event, in order to identify a sequences of actions which occur at the devices prior to the event.

19 Claims, 5 Drawing Sheets

SYSTEM FOR MONITORING A PLURALITY OF DISTRIBUTED DEVICES

RELATED APPLICATION

The present application claims priority to GB Application No. 1516427.0 filed Sep. 16, 2015, which is hereby incorporated herein in its entirety by reference.

TECHNICAL FIELD

The present subject matter relates generally to apparatus and methods for remotely monitoring a plurality of distributed devices in order to identify a sequences of actions which result in an event occurring at one or more of the distributed devices.

BACKGROUND

Devices capable of executing program code, such as IoT devices, servers, desktop computers, laptop computers, mobile telephones, tablets etc., are capable of recording the state of the device at the moment in time when an event, for example an error, occurs. However, errors are often caused by long sequences of unusual actions. In order to fix the program code and prevent future occurrences of the error a developer must work backwards from the record of the state of the device when the error occurred to find the root cause of the error. This is a difficult process, which is sometimes only possible by reproducing the error conditions many times in a laboratory.

SUMMARY

According to a first technique there is provided a computer-implemented method for monitoring events at a plurality of distributed devices. Each distributed device is operable to execute program code. The method comprises: detecting an event at one of said plurality of distributed devices; generating a first state record, said first state record defining a state of said one of said plurality of distributed devices when said event occurred; determining a first logging condition based on said first state record, said first logging condition defining a state of a distributed device at which a second state record is to be generated; and transferring said first logging condition to at least one of said plurality of distributed devices.

According to a second technique there is provided a computer program product comprising program code for performing the methods described herein.

According to a third technique there is provided an apparatus for monitoring events at a plurality of distributed devices. Each distributed device is operable to execute program code. The apparatus comprises: a state record module operable to receive a first state record from at least one of said plurality of distributed devices, said first state record defining a state of said at least one of said plurality of distributed devices when an event occurs at said at least one of said plurality of distributed devices; a logging condition module operable to evaluate said received first state record and determine a first logging condition based on said received first state record, said first logging condition defining a state of a distributed device at which a second state record is to be generated; and a communication module operable to transfer said first logging condition to at least one of said plurality of distributed devices.

According to a fourth technique there is provided a system for monitoring events at a plurality of distributed devices. The system comprises: a plurality of distributed devices, each distributed device operable to execute program code, detect an event at said distributed device, and generate a state record, said state record defining a state of said distributed device when said event occurred at said distributed device; and an apparatus operable to receive said state record, determine a logging condition based on said state record, said logging condition defining a state of a distributed device at which another state record is to be generated, and transfer said logging condition to at least one of said plurality of distributed devices.

BRIEF DESCRIPTION OF THE DRAWINGS

Embodiments will now be described with reference to the accompanying figures of which.

DESCRIPTION

Figure 1:
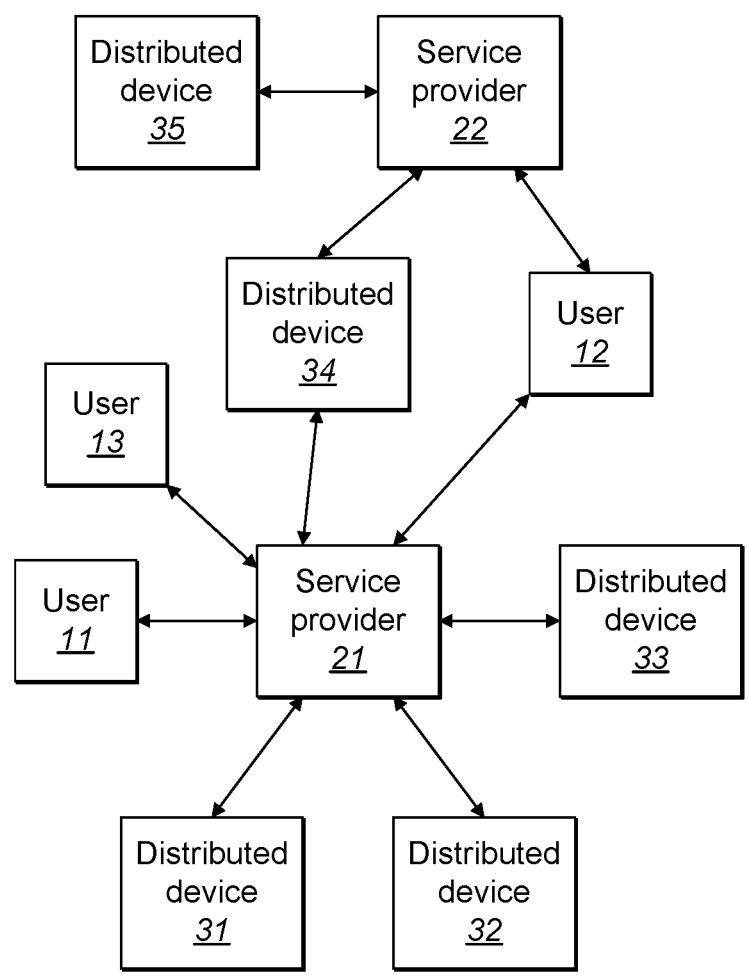
FIG. 1 schematically illustrates a system for monitoring a plurality of distributed devices.

In the figures, like reference numerals refer to the same or similar elements.

Reference will now be made in detail to the embodiments, examples of which are illustrated in the accompanying drawings. In the following detailed description numerous specific details are set forth by way of examples in order to provide a thorough understanding of the relevant teachings. However, it will be apparent to one of ordinary skill in the art that the present teachings may be practiced without these specific details.

FIG. 1 illustrates a system for monitoring a plurality of distributed devices. As shown in FIG. 1, the system comprises a service provider 21 capable of communicating with a plurality of distributed devices 31, 32, 33, 34, using any known wired or wireless communication technique. Each distributed device comprises a device which is capable of executing program code such as, for example, an IoT device, a server, a desktop computer, a laptop computer, a mobile telephone, a tablet etc. The distributed devices 31, 32, 33, 34 can be the same type of distributed device or different types of distributed devices. The embodiments are not limited to a specific type of distributed device.

The service provider 21 is capable of receiving data from the plurality of distributed devices 31, 32, 33, 34 and transferring instructions and/or data to the plurality of distributed devices 31, 32, 33, 34.

The service provider 21 is also capable of communication with a user 11 via a user interface (not illustrated), using any known wired or wireless communication technique. The service provider 21 is capable of transferring data to a user 11 and receiving instructions and/or data from the user 11.

In one embodiment, the service provider 21 is capable of communication with more than one user, for example, users 11, 12 and 13, as illustrated in FIG. 1. In another embodiment, more than one service provider may communicate with the same distributed devices, or different distributed devices. For example, in FIG. 1, service providers 21 and 22 are both capable of communicating with distributed device 34, however, only service provider 21 is capable of communicating with distributed devices 31, 32 and 33, and only service provider 22 is capable of communicating with distributed device 35. The embodiments are not limited to the specific arrangement and number of service providers, distributed devices or users.

As stated above, each distributed device is capable of executing program code. Each distributed device may be executing the same program code, for example running the same operating system or running the same program or application etc., as at least one other distributed device in the system. When a plurality of distributed devices are executing the same code, the same event often occurs multiple times on the plurality of distributed devices. Normally, the event occurs at different times as a result of when the code is executed on each device, but may happen at the same time at more than one device.

Each distributed device is capable of recording the state of the device at the moment in time when an event occurs at the device, sometimes referred to in the art as a state snapshot. This record of the state of the device (state record) is intended to help a developer to debug the program code.

The state record may comprise one or more of:
the current call stack of functions, part of the call stack, or in the case of a multi-threaded applications more than one current call stack;
the parameter values to functions on the call stack;
logged information about the internal state of the device;
logged information about the external environment;
last data received from the server; and/or
information stored in the memory about the state of the device.

In one embodiment, the event may be an error which occurs at a device. However, the event is not limited to being an error and any event which a user is interested in can be monitored. The occurrence of an event at a device triggers a state record SR to be generated.

Distributed devices do not store a history of the device when executing code, as this would result in burdensome amounts of data being stored. Consequently, only the state of the device at the moment in time when the event occurred is recorded. However, as stated above, errors are often caused by long sequences of unusual actions, so in order to fix the program code a developer must work backwards from the state record to find the root cause of the error.

Each distributed device is capable of transferring the state record or information derived from the state record to a service provider, for example a service provider 21, 22 illustrated in FIG. 1. The service provider functions as a collecting service, receiving a plurality of state records from a plurality of different distributed devices. The state records received at the service provider may have been triggered by the same or different events.

The receipt of a state record at the service provider indicates that an event has occurred at a distributed device. The service provider evaluates the state record SR, which defines the state of the distributed device at the moment in time when the event occurred, and determines a logging condition LC+1. The logging condition LC+1 defines a state of a device at which a state record SR+1 should be generated, prior to the event occurring. The determined logging condition LC+1 is then transferred to a plurality of the distributed devices. When the state of any one of the plurality of distributed devices matches the state of the device defined in the logging condition LC+1, a state record SR+1 is generated at that device. The state record SR+1 is an additional state snapshot generated at the time that the logging condition LC+1 is met. The state record SR+1 records the state of the device at the point in time when the state of the device matches the state of the device defined in the logging condition LC+1.

The state record SR+1 is then transferred to the service provider when the event subsequently occurs at the distributed device. When the event does not subsequently occur at the distributed device, then the state record SR+1 is discarded and a counter is incremented. The counter keeps track of how many times the logging condition LC+1 was met, but the event does not subsequently occur at the distributed device. In one embodiment, the counter is provided at the distributed device, and the count is periodically transmitted to the service provider. In another embodiment, the counter is provided at the service provider.

In another embodiment, the state record SR+1 records the state of the device from the point in time when the state of the device matches the state of the device defined in the logging condition LC+1 until the event occurs. All the actions which occur at the distributed device until the event occurs are recorded.

Figure 2:
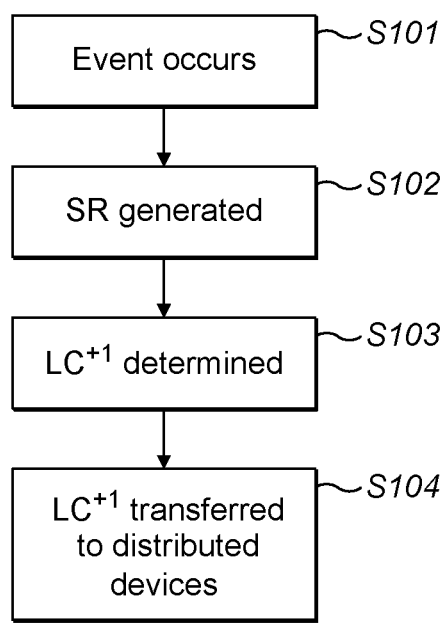
FIG. 2 is a flow diagram schematically illustrating a method for determining logging conditions.

FIG. 2 is a flow diagram schematically illustrating a method for determining logging conditions. In step S101 an event occurs at a distributed device. At step S102 a state record SR is generated, the state record defines the state of the distributed device at the moment in time when the event occurred. In one embodiment, the state record SR is transferred from the distributed device to the service provider. The state record SR is analyzed and a logging condition LC+1 is determined at step S103. The logging condition LC+1 defines a state of a device at which the state of the device should be logged. The logging condition LC+1 is then transferred to a plurality of distributed devices, which may or may not include the distributed device which generated the state record SR, at step S104. In one embodiment, the logging condition LC+1 is determined by the service provider. In another embodiment, the logging condition LC+1 is determined by the distributed device at which the event occurred and then transferred to the service provider for dissemination to a plurality of distributed devices As stated above, the service provider evaluates the state record SR and determines a logging condition at which the state of the device should be logged. The determination of the logging condition is an estimate as to what the state of the device would have been prior to the event occurring (in one example, at a time t−1). The state of the device at a time t−1 is inferred from the state record of the device at time t when the event occurred and prior knowledge of the program code.

In one embodiment, the service provider uses information about the success or failure of previous logging conditions in the same or different program codes to assist in the determination of logging conditions.

Since the determined logging condition is an approximation designed to include the state of the device prior to the event occurring, one of three situations could result upon dissemination of a logging condition:
1. the logging condition causes a state record to be generated prior to the event occurring in one or more of the distributed devices;
2. the logging condition causes a state record to be generated in many circumstances in which the event does not subsequently occur; or
3. the conditions defined in the logging condition are never met.

All three occurrences provide valuable information to the user regarding the event. When the logging condition LC+1 causes a state record to be generated prior to the event occurring in one or more of the distributed devices, the service provider has identified a unique set of circumstances that lead to the event. The data is recorded in a state record SR+1 at each of the distributed devices and transferred to the service provider. The service provider may then provide another logging condition LC+2 to the plurality of distributed devices. The service provider analyzes the state record SR+1 generated as a results of the logging condition LC+1 and determines another logging condition LC+2 which defines a state of the device at which a state record SR+2 should be generated, prior to the first logging condition LC+1 (for example, at a time t−2). The new logging condition LC+2 broadens the logging conditions defined in the first logging condition LC+1 to move earlier back in the sequence of actions that caused the event to occur. The new logging condition LC+2 is then transferred to a plurality of the distributed devices, such that when the state of a distributed device matches the state of the device defined in the logging condition LC+2, a state record SR+2 is generated. The state record SR+2 is transferred to the service provider and the service provider may then provide another logging condition LC+3 etc. The service provider continues to provide logging conditions, iteratively working back through the sequence of actions which resulted in the event occurring until the root cause of the event is identified.

When the logging condition LC+1 causes a state record SR+1 to be generated in many circumstances in which the event does not subsequently occur, the state record SR+1 is discarded and a counter is incremented to keep track of how many times the logging condition LC+1 was met when the event does not subsequently occur. It is determined that the event will not subsequently occur after a predetermined period of time has passed or it is determined that the event is not going to happen from the stack frames. For example, when the function that is at the top of the stack when the logging condition LC+1 was met returns without the event happening, then it can be determined that the event will not subsequently happen. Once it has been determined that the event will not subsequently occur, the service provider analyzes the previous state record (in this example SR) and determines another logging condition LC+1A. The logging condition LC+1A defines a state of the device at which a state record SR+1A should be generated, the logging condition LC+1A, narrows the logging conditions defined in the first logging condition LC+1. The new logging condition LC+1A is then transferred to a plurality of the distributed devices, such that when the state of a distributed device matches the state of the device defined in the logging condition LC+1A, a state record SR+1A is generated containing this information.

When the condition defined in the logging condition LC+1 are never met, the service provider analyzes the previous state record (in this example SR) generated as a results of the event occurring and determines another logging condition LC+1X. The logging condition LC+1X defines a state of the device at which a state record SR+1X should be generated, the logging condition LC+1X, broadens the logging condition defined in the first logging condition LC+1. The new logging condition LC+1X is then transferred to a plurality of the distributed devices, such that when the state of a distributed device matches the state of the device defined in the logging condition LC+1X, a state record SR+1X is generated containing this information.

In one embodiment, the service provider determines that the conditions defined in the logging condition LC+1 are never met, when no state records have been generated at any of the distributed devices after a predetermined period of time has elapsed.

Figure 3:
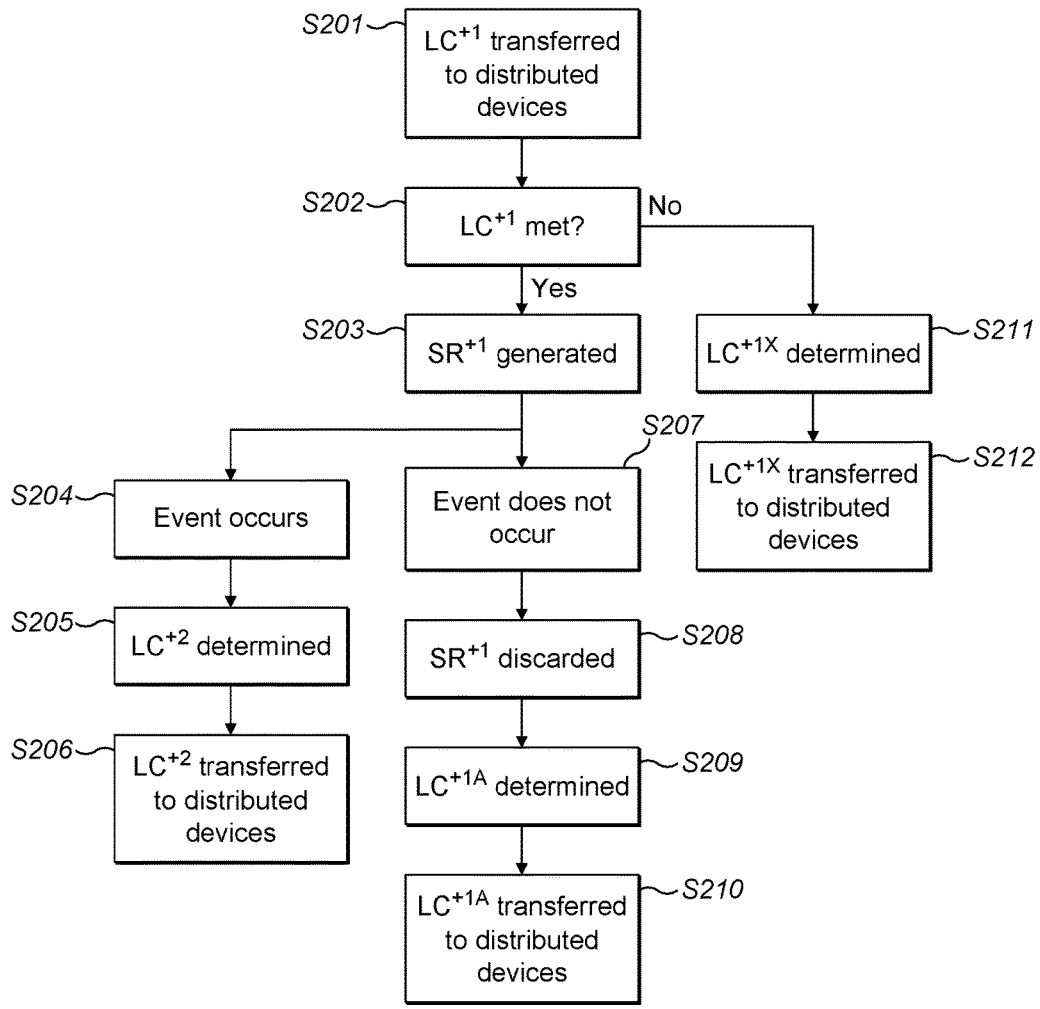
FIG. 3 is a flow diagram schematically illustrating another method for determining logging conditions.

FIG. 3 is flow diagram schematically illustrating a method for determining logging conditions. In step S201 the logging condition LC+1 is transferred to a plurality of distributed devices. When the logging condition LC+1 is met (step S202), at any one of the plurality of distributed devices, a state record SR+1 is generated at step S203. When the event subsequently occurs at the device, at step S204, the state record SR+1 is analyzed and a new logging condition LC+2 is determined at step S205. The logging condition LC+2 is then transferred to a plurality of distributed devices, which may or may not include the distributed device which generated the state record SR+1, at step S206. In one embodiment, the state record SR+1 is transferred from the distributed device at which the event occurred to the service provider, the service provider determines the new logging condition LC+2 and transfers the logging condition LC+2 to the plurality of distributed devices. In another embodiment, the logging condition LC+2 is determined by the distributed device at which the event occurred and then transferred to the service provider for dissemination to the plurality of distributed devices.

When the event does not subsequently occur at the device, at step S207, the state record SR+1 is discarded and a counter is incremented at step S208. The previous state record which was used to determine the logging condition LC+1 (in this example SR) together with the initial logging condition LC+1 is analyzed and a new logging condition LC+1A is determined at step S209. The logging condition LC+1A is then transferred to a plurality of distributed devices, which may or may not include the distributed device at which the event did not occur, at step S210. In one embodiment, the service provider determines the new logging condition LC+1A after a predetermined period of time has passed without the event occurring at any one of the plurality of distributed devices. In another embodiment, each distributed device transfers to the service provider the count of how many times the logging condition LC+1 has been met but the event has not subsequently occurred when a predetermined period of time has passed or when the count exceeds a predetermined value. In another embodiment, the logging condition LC+1A is determined by the distributed device at which the event did not occur, when the count exceeds a predetermined value. The new logging condition LC+1A is then transferred to the service provider for dissemination to a plurality of distributed devices.

When the logging condition LC+1 has not been met at step S202, the previous state record which was used to determine the logging condition LC+1 (in this example SR) is analyzed together with the initial logging condition LC+1 and a new logging condition LC+1X is determined at step S211. The logging condition LC+1X is then transferred to a plurality of the distributed devices at step S212. In one embodiment, the new logging condition LC+1X is determined by the service provider. In another embodiment, it is determined that the new logging condition LC+1X should be generated, when the state defined in the logging condition LC+1 has not been met at any of the plurality of distributed devices and a predetermined period of time has passed.

Following dissemination of a new logging condition at steps S206, S210 and S212, the method of FIG. 3 is performed again with the new logging condition, since steps S206, S210 and S212 are effectively the same as step S201 but with a different logging condition. The new logging condition LC+2, LC+1A or LC+1X is disseminated to a plurality of distributed devices and one of the three situations described above could result, i.e.:
1. the logging condition causes a state record to be generated prior to the event occurring in one or more of the distributed devices;
2. the logging condition causes a state record to be generated in many circumstances in which the event does not subsequently occur; or
3. the conditions defined in the logging condition are never met.

At some point, a situation will be reached where it is not possible to work any further backwards in the determination of the state of the device prior to an event occurring. At this point the service provider will notify a user about the event and provide the state records defining the sequence of actions that has been identified as leading to the event. The user may then manually define a further logging condition(s) for dissemination to the distributed devices, to verify their conclusions about the source of the event, or may deploy a software update to fix the error.

The logging conditions define a state of a device at which a state record is to be generated. For example, a logging condition may define a call stack of functions, and when the call stack of functions at a device match those defined in the logging condition, then a state record is generated. However, the state records may comprise more information about the state of the device then just the state of the device defined in the logging condition. For example, as stated above, all of the state records (SR, SR+1, SR+2, SR+1A, SR+1X etc.) may comprises one or more of:
  the current call stack of functions, part of the call stack, or in the case of a multi-threaded applications more than one current call stack;
  the parameter values to functions on the call stack;
  logged information about the internal state of the device;
  logged information about the external environment;
  last data received from the server; and/or
  information stored in the memory about the state of the device.

In one embodiment, the state record records the state of the call stack at the time of the event or the state of the call stack at the time defined in the logging condition. FIG. 4A illustrates a simplified call stack containing four functions F1, F2, F3 and F4. The function F4 is at the top of the stack. The stack illustrated in FIG. 4A is running normally without an event occurring.

Figure 4E:
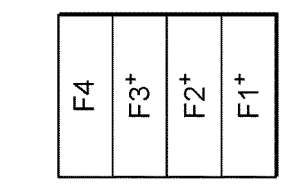
FIGS. 4A to 4E schematically illustrate a state of a stack.
Figure 4D:
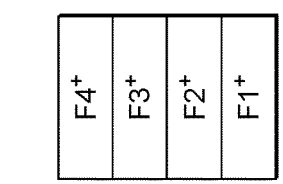
Figure 4C:
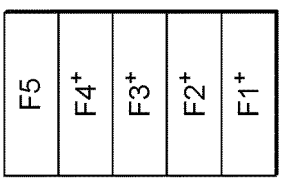
Figure 4B:
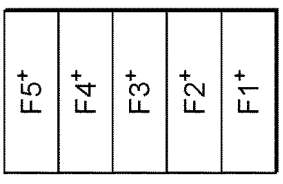
Figure 4A:
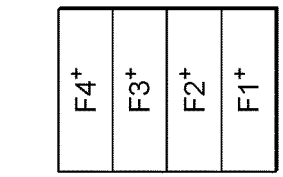

In FIG. 4B, an event, such as an error has occurred. The "+" indicates that something has happened after the function has been called to the stack, as it is unlikely that an event will occur at the call of a function before any instructions have been carried out. A state record generated at the time of the event would record the state of the stack as illustrated in FIG. 4B. In order to determine what sequence of actions lead to the event, a first logging condition LC+1 is determined. The logging condition LC+1 is determined to be the state of the stack prior to the function F5 begin carried out, for example the stack illustrated in FIG. 4C. Consequently, the state of the stack would be recorded when the state of the stack resembled that defined in the logging condition LC+1, illustrated in FIG. 4C. Assuming that the event subsequently occurs, it is then desirable to know what happened at the stack in the situation prior to that illustrated in FIG. 4C. Consequently, a second logging condition LC+2 is determined, such that the state of the stack would be recorded when the state of the stack resembles that illustrated in FIG. 4D. Assuming that the error subsequently occurs, it is then desirable to know what happened at the stack prior to that illustrated in FIG. 4D. Consequently, a third logging condition LC+3 is determined, such that the state of the stack would be recorded when the state of the stack resembled that illustrated in FIG. 4E. In FIGS. 4A to 4E, each logging condition causes the state of the stack to be recorded prior to the event occurring in one or more of the distributed devices. However, as explained above, each logging condition could also result in a state record being generated in many circumstances in which the event does not subsequently occur or the conditions defined in the logging condition never being met, in which case the method illustrated in FIG. 3 (steps S207 to S210, or steps S211 to S212) would be followed.

This process of determining logging conditions continues iteratively until it is not possible to work any further backwards in the determination of the state of the device prior to an event occurring. Alternatively, a user may determine that enough data has been obtained regarding the event, and stop the determination of more logging conditions.

FIGS. 4A to 4E are provided for illustrative purposes in order to provide a better understanding of the determination of the logging conditions. However, the embodiments are not limited to just recording the state of the stack (part of the stack or multiple stacks) and other data regarding the condition of the distributed device prior to an event occurring can be recorded in the state record. For example, the state record may comprise logged information about the internal state of the device; logged information about the external environment; data received from the server; or information stored in the memory about the state of the device. In one embodiment, a user can define what information regarding the state of the device should be recorded in the state record.

The system of the embodiments described enables a user to non-invasively track an event, which occurs when the same program code is executed at a plurality of distributed devices, and use the plurality of distributed devices to determine the state of the device in the period prior to the event, which resulted in the event occurring. The user is then able to create a debugging update for distribution to the plurality of distributed devices, without having to reproduce the event conditions many times in a laboratory. The system of the embodiments described applies equally well to large fleets of servers in a datacenter, or an application deployed to a large number of desktop computers.

In one embodiment, different determined logging conditions, determined as a result of the same event, are disseminated to different distributed devices, or different subsets of distributed devices, such that it is possible to ascertain which of the determined logging conditions result in the event occurring.

In one embodiment, different logging conditions determined as a result of different events, are disseminated to the same distributed devices, different distributed devices, or different subsets of distributed devices, such that it is possible to monitor numerous different events at the same time.

In one embodiment, the available distributed devices might be being used to debug many events at once, in which case, the service provider can suspend waiting for a very rare event to happen, and focus the devices on events which are more pressing. In another embodiment, the service provider can priorities different logging conditions amongst different distributed devices.

For example, statistical hypothesis testing with a Poisson distribution, or some other appropriate statistical distribution of event occurrences can be used to determine whether or not the logging condition is successful with a chosen degree of confidence.

In one embodiment, the available distributed devices are considered to be distributed devices which are currently within communication range of the service provider and which are provided with the program code which is to be monitored. For example, the program code to be monitored may be provided as part of the operating system (or similar version of the operating system) of the distributed device or an application or program (or similar version of the application or program) provided at the distributed device.

Recording the state of the device prior to an event occurring consume resources (such as power/bandwidth etc.) at the distributed devices. As stated above, the distributed devices, may be large mains powered devices such as servers and desktop computers, as well as smaller devices such as laptop computers, tablets, mobile telephones and even sensors, which are battery powered. Therefore, the service provider is capable of selecting a subset of all the available distributed devices to which it transfers the logging conditions. In one embodiment, the subset of available distributed devices which receives the logging conditions is changed at predetermined intervals, so that the logging conditions are not constantly disseminated to the same distributed devices. This spreads the resource requirements of the logging conditions across multiple distributed devices.

In addition, when the system comprises a large number of distributed devices, it may not be necessary to disseminate a logging condition to all of the available distributed devices in order to obtain meaningful state record data. In one embodiment, a logging condition is disseminated to a subset of the available distributed devices. In one example, the subset comprises 10% of the total available distributed devices.

In one embodiment, the state record, once generated is immediately transferred from the distributed device to the service provider. In another embodiment, once recorded the state record is stored at the distributed device prior to transfer to the service provider.

In one embodiment, the service provider waits for an event to occur several times, either at the same or at different distributed devices, before determining and disseminating a logging condition, in order to gain an estimate of the frequency of the event's occurrence.

As stated above the service provider is capable of monitoring one or more events at the plurality of distributed devices. Each event may be monitored on behalf of one or more users.

Following receipt of a state record at the service provider, the service provider transfers the state record to the one or more users who are interested in the event.

In one embodiment, state records are stored at the service provider. The state records are stored so that they can be transferred to a user at a later time, either with or without other state records, relating to the same or different events of interest to the user.

In another embodiment, the service provider transfers the state records to the user who is interested in the event, when the service provider cannot work any further backwards in the determination of the state of the device prior to an event occurring. The service provider transfers the state records to a user, via a user interface.

In one embodiment, more than one user may be interested in an event, the service provider therefore transfers the same state records regarding the event to all the users who are interested in the event. In one embodiment a user can monitor more than one event.

Following receipt of the one or more state records, the user can then either prepare a debugging update for the devices, or request further data, for example, generate a logging condition to be disseminated to the distributed devices by the service provider.

Following preparation of a debugging update by a user, the service provider can then be utilized by the user to disseminate the update to the distributed devices.

As stated above, the event may be an error which occurs at a device. However, the event is not limited to being an error and any event which the user would like to monitor can be selected. For example, the user could define a logging condition regarding the event of interest to the user. The service provider disseminates the user defined logging condition to the plurality of distributed devices, and then determines logging conditions when the event has occurred at, at least one of the distributed devices. The user can then be provided with the state records generated regarding the event of interest.

The service provider may be any data processing apparatus having capacity to perform the required functions, such as a server, a desk top computer etc.

Figure 5:
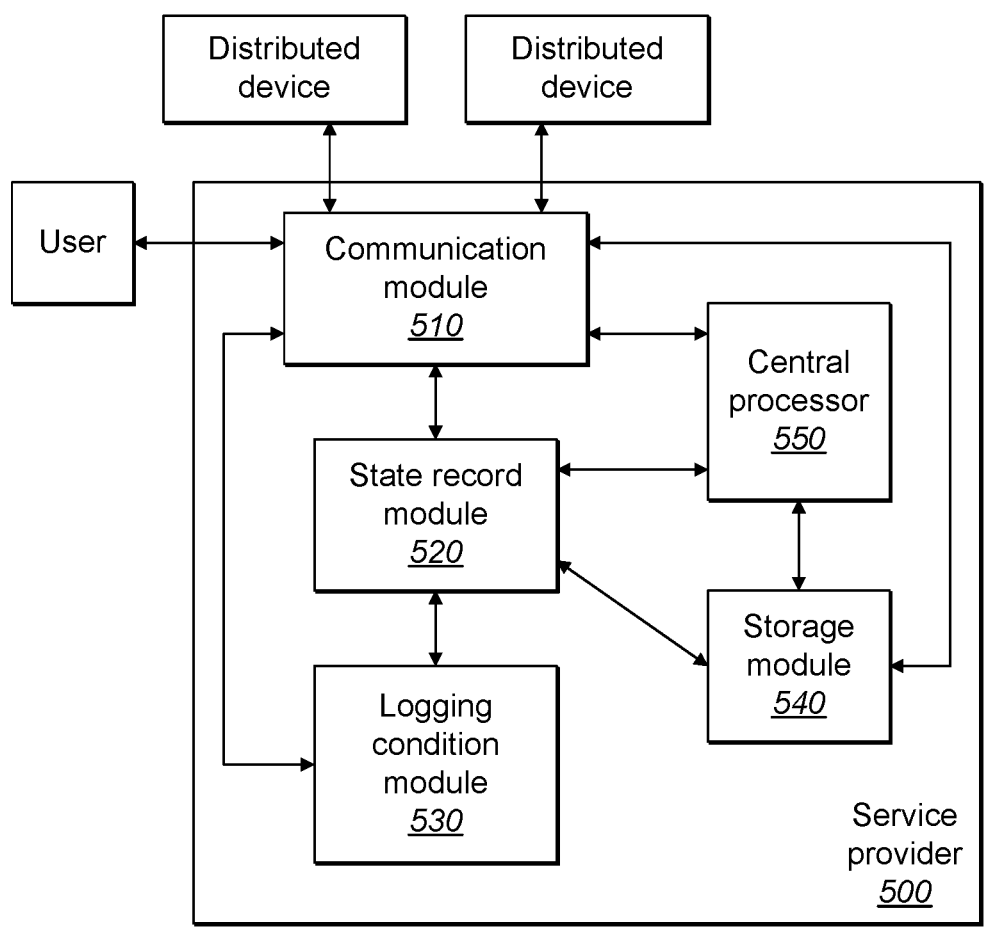
FIG. 5 schematically illustrates a service provider.

FIG. 5 illustrates schematically a service provider 500 for monitoring events at a plurality of distributed devices. As illustrated in FIG. 5, the service provider 500 comprises a communication module 510, a state record module 520, a logging condition module 530, a storage module 540, and a central processor 550. The communication module 510 is operable to communicate with a plurality of distributed devices and at least one user, receiving state records from the plurality of distributed devices and transferring logging conditions to the plurality of distributed devices. The state record module 520 is operable to receive the state records from the plurality of distributed devices. The state record module 520 is also operable to determine that no state records have been generated at any of the distributed devices as a result of a logging condition when a predetermined period of time has passed and, when no state records have been generated after the predetermined period of time has passed, request a new logging condition from the logging condition module 530. The logging condition module 530 is operable to evaluate the received state records and determine logging conditions defining a state of a distributed device at which a state record should be generated. The storage module is operable to store the state records.

In one embodiment, the service provider 500 includes a distribution module operable to select a subset of the plurality of distributed devices to which the communication module transfers the logging conditions.

In another embodiment, a distributed device may be provided with a state record module and a logging condition module. The state record module operable to determine that no state records have been generated at the distributed device as a result of a logging condition when a predetermined period of time has passed and, when no state records have been generated after the predetermined period of time has passed, request a new logging condition from the logging condition module. The logging condition module operable to evaluate the received state records and determine logging conditions defining a state of a distributed device at which a state record should be generated. The state record module and logging condition module can be provided as part of the operating system of the device or as a separate application at the device.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations for the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on a user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing examples without departing from the scope of the present techniques.

As will be appreciated from the foregoing specification, techniques are described providing a computer-implemented method, apparatus and system for monitoring events at a plurality of distributed devices.

In embodiments, the computer-implemented method may further comprises: generating said second state record when said state of at least one of said plurality of distributed devices corresponds to said first logging condition; detecting said event at said at least one of said plurality of distributed devices; determining a second logging condition based on said second state record, said second logging condition defining a state of a distributed device at which a third state record is to be generated, said second logging condition broadening said state of said distributed device defined in said first logging condition; and transferring said second logging condition to at least one of said plurality of distributed devices.

It is possible for a user to examine the state of a device by stepping back through the sequence of actions which occurred at the device prior to an event. Therefore, by iteratively determining logging conditions defining a state of the device prior to an event and then recording the state of the device when the logging conditions are met, the user does not have to reproduce the event multiple times in a laboratory in order to determine the cause of the event.

In embodiments, the computer-implemented method may further comprise: generating said second state record when said state of at least one of said plurality of distributed devices corresponds to said first logging condition; determining that said event will not occur at said at least one of said plurality of distributed devices; discarding said second state record; determining a third logging condition based on said first state record, said third logging condition defining a state of a distributed device at which a fourth state record is to be generated, said third logging condition narrowing said state of said distributed device defined in said first logging condition; and transferring said third logging condition to at least one of said plurality of distributed devices. Information regarding states of the device which do not result in the event occurring is provided which can be useful to a user who is determining the cause of an event.

In embodiments, the computer-implemented method may further comprise: generating said third state record when said state of at least one of said plurality of distributed devices corresponds to said second logging condition; determining that said event will not occur at said at least one of said plurality of distributed devices; discarding said third state record; determining a fourth logging condition based on said second state record, said fourth logging condition defining a state of a distributed device at which a fifth state record is to be generated, said fourth logging condition narrowing said state of said distributed device defined in said second logging condition; and transferring said fourth logging condition to at least one of said plurality of distributed devices. Information regarding states of the device which do not result in the event occurring is provided which can be useful to a user who is determining the cause of an event.

In embodiments, the computer-implemented method may further comprise: determining that said event will not occur at said at least one of said plurality of distributed devices comprises: determining that a predetermined period of time has passed and said event has not occurred at said at least one of said plurality of distributed devices. This enable the service provider or distributed device to determine when a logging condition is not resulting in the event and that a new logging condition should be determined.

In embodiments, the computer-implemented method may further comprise: incrementing a counter when it is determined that said event will not occur at said at least one of said plurality of distributed devices.

In embodiments, the computer-implemented method may further comprise: determining that a predetermined period of time has passed and that a state of a distributed device defined in any one of said first, second, third or fourth logging conditions has not been met; determining a fifth logging condition based on said determination that a state of a distributed device defined in any one of said first, second, third or fourth logging conditions has not been met, said fifth logging condition defining a state of a distributed device at which a sixth state record is to be generated, said fifth logging condition broadening said state of said distributed device defined in said any one of said first, second, third or fourth logging conditions which has not been met; and transferring said fifth logging condition to at least one of said plurality of distributed devices.

In embodiments, the computer-implemented method may further comprise: transferring said state records to a user.

In embodiments, the computer-implemented method may further comprise: transferring a logging condition defined by a user to at least one of said plurality of distributed devices. The user is able to provide logging conditions so that they can verify their conclusions regarding the cause of an event.

In embodiments, the computer-implemented method may further comprise: transferring a program code update to at least one of said plurality of distributed devices. The user is able to create a debugged program once the cause of the event is known and transfer it to the plurality of distributed devices.

In embodiments, the event may comprise an error in said program code at said at least one of said plurality of distributed devices.

In embodiments, the state records may comprise one or more of:
a. a call stack of functions at said distributed devices, part of a call stack of functions, or more than one call stack of functions;
b. parameter values to functions on a call stack at said distributed devices;
c. logged information about an internal state of said distributed devices;
d. logged information about an external environment of said distributed devices;
e. last data received from a server in communication with said distributed devices; and
f. information about a state of said distributed devices stored in a storage device at said distributed devices.

In embodiments, a user may define a content of said state record. The user is provided with the choice of what information should be recorded in the state record.

In embodiments, one or more different events may be detected at said plurality of distributed devices. The service provider is able to monitor several events at the same time, providing greater efficiency for the users interested in the events.

In embodiments, the computer-implemented method may further comprise: determining two or more different first, second, third, fourth or fifth logging conditions based on said same state record; and transferring said two or more different first, second, third, fourth or fifth logging conditions to at least one of said plurality of distributed devices. If several different logging conditions are determined based on a state record, all of the logging conditions can be disseminated to different distributed devices, such that it is possible to be determine which logging condition in fact defines a state of the device prior to the event occurring, again increasing efficiency.

In embodiments, the at least one of said plurality of distributed devices which is transferred said first, second, third, fourth or fifth logging condition may be operable to execute the same program code as said one of said plurality of distributed devices at which said event was detected.

In embodiments, the state record module may be further operable to receive said second state record from at least one of said plurality of distributed devices; said logging condition module is further operable to determine a second logging condition based on said second state record, said second logging condition defining a state of a distributed device at which a third state record is to be generated, said second logging condition broadening said state of said distributed device defined in said first logging condition; and said communication module is further operable to transfer said second logging condition to at least one of said plurality of distributed devices.

It is possible for a user to examine the state of a device by stepping back through the sequence of actions which occurred at the device prior to an event. Therefore, by iteratively determining logging conditions defining a state of the device prior to an event and then recording the state of the device from the logging conditions until the event occurs, the user does not have to reproduced the event multiple times in a laboratory in order to determine the cause of the event.

In embodiments, the state record module may be further operable to determine that a predetermined period of time has passed and said second state record has not been received from at least one of said plurality of distributed devices, and request a third logging condition from said logging condition module; said logging condition module is further operable to determine said third logging condition based on said first state record, said third logging condition defining a state of a distributed device at which a fourth state record is to be generated, said third logging condition narrowing said state of said distributed device defined in said first logging condition; and said communication module is further operable to transfer said third logging condition to at least one of said plurality of distributed devices.

In embodiments, the state record module may be further operable to determine that a predetermined period of time has passed and said third state record has not been received from at least one of said plurality of distributed devices, and request a fourth logging condition from said logging condition module; said logging condition module is further operable to determine said fourth logging condition based on said second state record, said fourth logging condition defining a state of a distributed device at which a fifth state record is to be generated, said fourth logging condition narrowing said state of said distributed device defined in said second logging condition; and said communication module is further operable to transfer said fourth logging condition to at least one of said plurality of distributed devices.

In embodiments, the state record module may be further operable to determine that a predetermined period of time has passed and that no state records have been generated as a result of said first, second, third or fourth logging conditions, and request a fifth logging condition from said logging condition module; said logging condition module is further operable to determine said fifth logging condition based on said determination that a state of a distributed device defined in any one of said first, second, third or fourth logging conditions has not been met, said fifth logging condition defining a state of a distributed device at which a sixth state record is to be generated, said fifth logging condition broadening said state of said distributed device defined in said any one of said first, second, third or fourth logging conditions which has not been met; and said communication module is further operable to transfer said fifth logging condition to at least one of said plurality of distributed devices.

In embodiments, the communication module may be further operable to transfer said state records to one or more users. More than one user can be interested in the same event and the same data can be transferred to multiple users.

In embodiments, the communication module may be further operable to receive a user logging condition from one or more users, said user logging condition defining a state of a distributed device at which a user state record is to be generated; and said communication module is further operable to transfer said user logging condition to at least one of said plurality of distributed devices. The user is able to provide logging conditions so that they can verify their conclusions regarding the cause of an event.

In embodiments, the communication module may be further operable to receive a program code update defined by a user; and said communication module is further operable to transfer to said program code update to at least one of said plurality of distributed devices. The user is able to create a debugging program once the cause of the event is known and transfer it to the plurality of distributed devices.

In embodiments, the state record module may be further operable to receive state records generated when one or more different events occur at said plurality of distributed devices. The service provider is able to monitor several events at the same time, providing greater efficiency for the users interested in the events.

In embodiments, the logging condition module may be further operable to evaluate said received first, second, third or fourth state record and determine two or more different first, second, third, fourth or fifth first, second, third or fourth logging conditions based on said same received first, second, third or fourth state record, said two or more different first, second, third or fourth logging conditions defining two or more different a states of a distributed device at which recoding of said state of said device should begin a state record is to be generated; and said communication module is further operable to transfer said two or more different first, second, third, fourth or fifth first, second, third or fourth logging conditions to at least one of said plurality of distributed devices. If several different logging conditions are determined based on a state record, all of the logging conditions can be disseminated to different distributed devices, such that it is possible to be determine which logging condition in fact defines a state of the device prior to the event occurring, again increasing efficiency.

In another example, a distribution module is provided. The distribution module is operable to select a subset of said plurality of distributed devices to which said communication module transfers said logging conditions. This prevents all of the plurality of devices being monitored at the same time.

In embodiments, the distribution module may be further operable change said subset of said plurality of distributed devices to which said communication module transfers said logging conditions at predetermined intervals. This spreads out the power requirements of monitoring the devices across all of the devices in the system.

In embodiments, a storage module operable to store said state records may be provided.

In embodiments, the system may further comprise a user; and said apparatus may be further operable to transfer said state record to said user.

In embodiments, the apparatus may be further operable to receive a user logging condition from said user, and transfer said user logging condition to at least one of said plurality of distributed devices.

The invention claimed is:

1. A computer-implemented method for monitoring events at a plurality of distributed devices, each distributed device operable to execute program code, the method comprising:
   detecting an event at one of said plurality of distributed devices;
   generating a first state record, said first state record defining a state of said one of said plurality of distributed devices when said event occurred;
   determining a first logging condition based on said first state record, said first logging condition defining an estimated state of a distributed device prior to the state of the distributed device defined in said first state record, and at which a second state record is to be generated; and
   transferring said first logging condition to at least one of said plurality of distributed devices.

2. The computer-implemented method of claim 1, further comprising:
   generating said second state record when said state of at least one of said plurality of distributed devices corresponds to said first logging condition;
   detecting said event at said at least one of said plurality of distributed devices;
   determining a second logging condition based on said second state record, said second logging condition defining a state of a distributed device at which a third state record is to be generated, said second logging condition broadening said state of said distributed device defined in said first logging condition; and
   transferring said second logging condition to at least one of said plurality of distributed devices.

3. The computer-implemented method of claim 1, further comprising:
   generating said second state record when said state of at least one of said plurality of distributed devices corresponds to said first logging condition;
   determining that said event will not occur at said at least one of said plurality of distributed devices;
   discarding said second state record;
   determining a second logging condition based on said first state record, said second logging condition defining a state of a distributed device at which a third state record is to be generated, said second logging condition narrowing said state of said distributed device defined in said first logging condition; and
   transferring said second logging condition to at least one of said plurality of distributed devices.

4. The computer-implemented method of claim 3, wherein determining that said event will not occur at said at least one of said plurality of distributed devices comprises:

determining that a predetermined period of time has passed and said event has not occurred at said at least one of said plurality of distributed devices.

5. The computer-implemented method of claim 3, further comprising:
incrementing a counter when it is determined that said event will not occur at said at least one of said plurality of distributed devices.

6. The computer-implemented method of claim 1, further comprising:
determining that a predetermined period of time has passed and that the state of a distributed device defined in said first logging conditions has not been met;
determining a second logging condition based on said determination that a state of a distributed device defined in said first logging condition has not been met, said second logging condition defining a state of a distributed device at which a third state record is to be generated, said second logging condition broadening said state of said distributed device defined in said first logging condition which has not been met; and
transferring said second logging condition to at least one of said plurality of distributed devices.

7. The computer-implemented method of claim 1, further comprising:
transferring a logging condition defined by a user to at least one of said plurality of distributed devices.

8. The computer-implemented method of claim 1, wherein said state records comprise one or more of:
g. a call stack of functions at said distributed devices, part of a call stack of functions, or more than one call stack of functions;
h. parameter values to functions on a call stack at said distributed devices;
i. logged information about an internal state of said distributed devices;
j. logged information about an external environment of said distributed devices;
k. last data received from a server in communication with said distributed devices; and
l. information about a state of said distributed devices stored in a storage device at said distributed devices.

9. The computer-implemented method of claim 1, further comprising:
determining two or more different logging conditions based on said same state record; and
transferring said two or more different logging conditions to at least one of said plurality of distributed devices.

10. The computer-implemented method of claim 1, wherein said at least one of said plurality of distributed devices which is transferred said first logging condition is operable to execute the same program code as said one of said plurality of distributed devices at which said event was detected.

11. An apparatus for monitoring events at a plurality of distributed devices, each distributed device operable to execute program code, said apparatus comprising:
a processor and a memory operably coupled to the processor;
instructions that, when executed on the processor, cause the processor to implement:
a state record module operable to receive a first state record from at least one of said plurality of distributed devices, said first state record defining a state of said at least one of said plurality of distributed devices when an event occurs at said at least one of said plurality of distributed devices;
a logging condition module operable to evaluate said received first state record and determine a first logging condition based on said received first state record, said first logging condition defining an estimated state of a distributed device prior to the state of the distributed device defined in said first state record, and at which a second state record is to be generated; and
a communication module operable to transfer said first logging condition to at least one of said plurality of distributed devices.

12. The apparatus of claim 11, wherein:
said state record module is further operable to receive said second state record from at least one of said plurality of distributed devices;
said logging condition module is further operable to determine a second logging condition based on said second state record, said second logging condition defining a state of a distributed device at which a third state record is to be generated, said second logging condition broadening said state of said distributed device defined in said first logging condition; and
said communication module is further operable to transfer said second logging condition to at least one of said plurality of distributed devices.

13. The apparatus of claim 11, wherein:
said state record module is further operable to determine that a predetermined period of time has passed and said second state record has not been received from at least one of said plurality of distributed devices, and request a second logging condition from said logging condition module;
said logging condition module is further operable to determine said second logging condition based on said first state record, said second logging condition defining a state of a distributed device at which a third state record is to be generated, said second logging condition narrowing said state of said distributed device defined in said first logging condition; and
said communication module is further operable to transfer said second logging condition to at least one of said plurality of distributed devices.

14. The apparatus of claim 11, wherein:
said state record module is further operable to determine that a predetermined period of time has passed and that no state records have been generated as a result of said first logging condition, and request a second logging condition from said logging condition module;
said logging condition module is further operable to determine said second logging condition based on said determination that a state of a distributed device defined in said first logging condition has not been met, said second logging condition defining a state of a distributed device at which a third state record is to be generated, said second logging condition broadening said state of said distributed device defined in said first logging condition which has not been met; and
said communication module is further operable to transfer said second logging condition to at least one of said plurality of distributed devices.

15. The apparatus of claim 11, wherein:
said communication module is further operable to receive a user logging condition from one or more users, said user logging condition defining a state of a distributed device at which a user state record is to be generated; and said communication module is further operable to transfer said user logging condition to at least one of said plurality of distributed devices.

16. The apparatus of claim 11, wherein:
said logging condition module is further operable to determine two or more different logging conditions based on said same state record, said two or more different logging conditions defining two or more different states of a distributed device at which a state record is to be generated; and
said communication module is further operable to transfer said two or more different logging conditions to at least one of said plurality of distributed devices.

17. The apparatus of claim 11, further comprising:
a distribution module operable to select a subset of said plurality of distributed devices to which said communication module transfers said logging conditions.

18. The apparatus of claim 17, wherein:
said distribution module is further operable to change said subset of said plurality of distributed devices to which said communication module transfers said logging conditions at predetermined intervals.

19. A system for monitoring events at a plurality of distributed devices, the system comprising:
a plurality of distributed devices, each distributed device operable to execute program code, detect an event at said distributed device, and generate a state record, said state record defining a state of said distributed device when said event occurred at said distributed device; and an apparatus operable to receive said state record, determine a logging condition based on said state record, said logging condition defining an estimated state of a distributed device prior to the state of the distributed device defined in said first state record, and at which another state record is to be generated, and transfer said logging condition to at least one of said plurality of distributed devices.

* * * * *